United States Patent [19]

Sonnenberg et al.

[11] Patent Number: 5,017,532

[45] Date of Patent: May 21, 1991

[54] SINTERED CERAMIC PRODUCT

[75] Inventors: Neville Sonnenberg, Johannesburg, South Africa; Angus I. Kingon, Cary, N.C.; Adrian W. Paterson, Pretoria, South Africa

[73] Assignee: CSIR, South Africa

[21] Appl. No.: 355,100

[22] Filed: May 12, 1989

Related U.S. Application Data

[63] Continuation of Ser. No. 210,848, Jun. 24, 1988, abandoned.

[30] Foreign Application Priority Data

Jun. 24, 1987 [ZA] South Africa ................ 87/4575

[51] Int. Cl.$^5$ ............................................. C04B 35/48
[52] U.S. Cl. .................................... 501/103; 501/104; 501/152
[58] Field of Search .................... 501/103, 104, 152

[56] References Cited

U.S. PATENT DOCUMENTS

Re. 32,449   6/1987   Claussen et al. ................... 501/103
4,690,910    9/1987   Tsukuma et al. ................... 501/103

FOREIGN PATENT DOCUMENTS 3408096    10/1984   Fed. Rep. of Germany ...... 501/103
59-152266   8/1984   Japan ................................. 501/103
60-246261  12/1985   Japan ................................. 501/103

OTHER PUBLICATIONS

Lange, F. F., "Transformation Toughening", Journal of Materials Science 17 (1982) 255-262.
Coyle, T. W. et al., Am. Ceram. Soc. Bull 62 (1983) 966.
Tsukuma et al., "Strength, Fracture Toughness & Vickers Hardness of CeO$_2$-Stabilized Tetragonal ZrO$_2$ Polycrystals (Ce-TZP)", Journal of Materials Science 20 (1985) 1178-1184.
Tsukuma, Koji "Mech. Properties & Thermal Stability of CeO$_2$ Containing Tetragonal Zirconia Polycrystals,", Am. Ceram. Soc. Bull., 65 (1986) 1386-1389.
Nettleship, I. et al., "Tetragonal Zirconia Polycrystal (TZP)—A Review", Int. J. High Technology Ceramics 3 (1987) 1-32.
Duh et al., "Study on Rare-Earth-Oxide-Doped Yttria Tetragonal Zirconia", High Tech. Ceramics (Elsevier Science Publishers H. V., Amsterdam (1987) 1281).
Komolikov et al., "High Strength Ceramic From Zirconium Dioxide Partly Stabilized with Ytterbium Oxide", Translated from Ogneupory, No. 8, pp. 20-22, Aug. 1986.
Hanna et al., "Characterization & Densification of Lanthana-Zirconia Powders Prepared by High Temp. Hydrolysis", Rev. Int. Hautes Temper. Refract., Fr., 1985, 22, 168-174.
Hanna, S. B. et al., "Characterization & Densification of Lanthana-Zirconia Powders Prepared by High Temperature Hydrolysis", Journal of Materials Science 21 (1986) 3043-3049.
Bastide, B. et al., "Phase Equilibrium & Martensitic Transformation in Lanthana-Doped Zirconia", J. Am. Ceram. Soc., 71 [6], 449-453, (1988).
Blackburn, S., et al., "Structure-Prop. Relationships for REO PSZ Pieces Pressed from Homogeneous Electrorefined Powders", Advances in Ceramics vol. 24: Science & Technology of Zirconia III (1988) 211-215.

*Primary Examiner*—William R. Dixon, Jr.
*Assistant Examiner*—Anthony J. Green
*Attorney, Agent, or Firm*—Arnold, White & Durkee

[57] ABSTRACT

The invention provides a sintered ceria/zirconia ceramic and a method of making it. The product comprises a substantially homogeneous mixture of 76-92 mole % zirconia, 8-20 mole % ceria and 0.1-1.2 mole % lanthana and/or praseodymia. The method involves heating an artifact comprising said mixture to a temperature in the range 1200°-1700° C.

35 Claims, No Drawings

SINTERED CERAMIC PRODUCT

This is a continuation of co-pending application Ser. No. 210,848 filed on June 24, 1988.

BACKGROUND OF THE INVENTION

1. Field of the Invention

This invention relates to a sintered ceramic product and to a method of making it. More particularly it relates to a sintered ceria/zirconia ceramic product.

2. Description of the Prior Art

Lange, F. F., J. Mat. Sci., 17(1982)255 proposed an yttria/ceria/tetragonal zirconia polycrystal ceramic on the basis of the phase diagram, which displayed a large tetragonal phase region up to almost 20 mole % ceria in the sintering range of zirconia-based materials (i.e. 400°–1600° C.).

Coyle, T. W. et al, Am. Ceram. Soc. Bull., 62(1983)966 manufactured material of the type proposed by Lange, and measured mechanical properties of such material containing 10–20 mole % ceria.

Tsukuma et al in U.S. Pat. No. 4,690,910 and J. Mat. Sci., 20(1985)1178 disclosed ceria/zirconia ceramics containing a minor proportion of from 4 to 30 mole % ceria, with lanthana, among other substances, mentioned as a possible impurity in the ceria, which was required to be at least 80 mole % pure. Preparation of the ceramics via a hydrolysis route was disclosed.

Tsukuma in Am. Ceram. Soc. Bull., 65(1986)1386 also disclosed ceria/zirconia ceramics containing from 8 to 16 mole % ceria and lanthana as an impurity (7 mole % of the commercial grade ceria used). The results of tests of mechanical properties were disclosed, together with a comparison thereof with yttria/zirconia ceramics.

Ceria/Zirconia ceramics are also disclosed in a review of tetragonal zirconia polycrystal in Int. J. High Technology Ceramics 3(1987)1; and Duh et al in High Tech. Ceramics (Elsevier Science Publishers H.V., Amsterdam (1987)1281) also disclosed ceria/zirconia ceramics, containing small quantities of rare earth metal oxides.

BROAD DESCRIPTION OF THE INVENTION

An object of the present invention is to provide a sintered ceria/zirconia ceramic product of enhanced toughness.

A yet further object of the invention is to provide a sintered ceria/zirconia ceramic product having enhanced toughness in combination with other desirable properties with regard to density, resistance to cracking, hardness, modulus of rupture and grain size.

A further object of the invention is to provide a sintered ceria/zirconia ceramic product suitable for use in the engineering ceramic industry.

It is a further object of the invention to permit the production of ceria/zirconia ceramic products with toughness greater than any prior ceria/zirconia ceramics known to the inventors.

A further object is to obtain this enhance toughness with ceria contents of no more than of the order of about 10 mole % ceria.

According to the invention there is provided a sintered ceramic product which comprises a substantially homogeneous mixture of:
76–92 mole % zirconia;
8–20 mole % ceria; and
0.1–1.2 mole % of a rare earth metal oxide selected from the group consisting of lanthana, praseodymium and mixtures thereof.

DETAILED DESCRIPTION OF THE INVENTION

Preferably the product comprises:
82–90 mole % zirconia;
10–12 mole % ceria; and
0.5–0.8 mole % of lanthana or praseodymium; and more preferably it comprises:
88–90 mole % zirconia;
10–10.5 mole % ceria; and
0.25–0.6 mole % of lanthana or praseodymium While it is believed that a combination of lanthana and praseodymium can be present, the ceramic will usually contain either lanthana or praseodymium, typically lanthana, which is preferred for its availability and cost.

The constituents of the ceramic product will typically be present as complex oxides in which the ceria and rare earth metal oxide are dispersed in a zirconia sub-lattice, mainly in the tetragonal phase or in a mixture of tetragonal and cubic phases. Other phases may however be present, such as pyrochlore-type phases, and will, like the cubic phase, typically be present in minor proportions by mass. These phases are exemplified by $La_2Zr_2O_7$ [a pyrochlore-type phase] and $Ce_2Zr_2O_7$ [a cubic phase in which the Ce is in a 3+ oxidation state]. Such phases can coexist in the ceramic and are not regarded as impurities. A limited proportion [not more than 30% by mass] and preferably as little as possible, of the monoclinic phase can be tolerated in the ceramic products of the invention.

can be determined by X-ray diffraction in the usual way. Impurities can be determined by chemical analysis and/or by X-ray techniques in the usual way.

The Applicant believes that in general the ceramic product should contain as low a proportion of impurities as possible. In particular the ceramic product should contain as low a proportion as possible of the impurities constituted by one or more members of the group consisting of $HfO_2$, $SiO_2$, $Nd_2O_3$, $Gd_2O_3$, $Yb_2O_3$, $Sm_2O_3$, $TiO_2$ and mixtures thereof, e.g., at most 5% by mass, preferably less than 2% and more preferably less than 1%.

More particularly neodymia [$Nd_2O_3$], gadolinia [$Gd_2O_3$] and ytterbia [$Yb_2O_3$] and mixtures thereof have been found to constitute harmful impurities, and they in total should not make up more than 0.1 mole % of the ceramic product of the invention, being preferably less than 0.05 mole % and more preferably less than 0.01 mole % thereof.

The ceramic products of the invention can have a four-point bend strength or modulus of rupture of above 400 MPa and a fracture toughness of above 4 MPa.m$^{\frac{1}{2}}$. As powders, the ceramic products of the invention can be used in $Al_2O_3/ZrO_2$ systems across the full range of compositions.

According to another aspect of the invention there is provided a method of making a sintered ceramic product which comprises sintering to a temperature in the range 1200°–1700° C. a mixture of:
76–92 mole % zirconia;
8–20 mole % ceria; and 0.1-1.2 mole % of a rare earth metal oxide selected from the group consisting of lanthana, praseodymium and mixtures thereof.

Typically the sintering temperature will be 1350° C.-1650° C. and the sintering will be in air for a period which can vary within wide limits, e.g., as low as 1-3 minutes minimum up to a maximum as high as 70-80 hours. It is believed that the rates of heating, and cooling after sintering, can also vary within wide limits, and values of about 100° C./h have been employed for heating and cooling. In the sintering an acceptably high degree of densification is required with an acceptably controlled grain size, within an acceptable time. Higher temperatures reduce the time required for densification but lead to increased grain size, while lower temperatures reduce grain size but increase the cycle time needed for densification. Routine experimentation can easily be carried out to determine, depending on the properties required for the product and economic considerations, the best combination of temperature and heating period or cycle time. Typically the temperature and heating period will be selected to obtain an average grain size of less than 4 microns, e.g., 0.1-3 microns. In this regard it is contemplated that the ceramics of the invention will have various uses, for which different properties, within limits, may be desirable, e.g., cutting tool tips; the blades of shears or scissors; wire dies and hot extrusion dies; pump seals, valves and impellers; biological implants; milling media; engine components; rock drilling applications; wear parts; rock breaking and mining applications; etc. The ceramics of the present invention are accordingly suited for engineering-type uses, as contrasted with refractory ceramics, and it is believed that the ability of the tetragonal phase to transform to the monoclinic phase in stress fields adjacent to the cracks in the present ceramics, thereby absorbing energy and tending to close cracks by virtue of an associated volume increase, is an advantage of the invention. The small grain sizes attainable can also be advantageous and lead to improved strength in the ceramics. The ceramics of the present invention are also resistant to hydrolysis of the ceria. Such hydrolysis can limit the usefulness of other zirconia-based ceramics.

The starting materials should preferably be mixed as homogeneously as practicable before the sintering. Although the starting mixture can be prepared by dry powder mixed-oxide routes, a wet chemical synthesis of the starting mixture is preferred for enhanced homogeneity. Thus, in accordance with the method, the mixture which is sintered may be obtained by initially forming a solution of salts of zirconium, cerium and a rare earth metal selected from the group consisting of lanthanum, praseodymium and mixtures thereof. This solution may be heated to obtain a solid hydrolysed mixture, the mixed material then being dried. Instead, the solution may be treated with an alcohol or base to obtain a precipitate of mixed solid or gel material, which is then dried. The dried material may then be ground or milled, calcined in air at a temperature of 500°-1100° C. to convert it to a complex oxide, the complex oxide being ground or milled, dried and pressed to form an artifact which is sintered.

More particularly, wet chemical synthesis may thus involve preparing an aqueous solution of suitable salts, e.g. the oxychlorides, chlorides, nitrates and/or sulphates or the like, of Zr, Ce and La/Pr, in molar ratios equivalent to the intended zirconia:ceria:lanthana/praseodymia ratios, at suitable concentrations and heating for suitable time to a suitable elevated temperature, as commonly employed in the art, e.g., 15-100 hrs. at 70°-120° C., thereby after evaporation of the water to obtain a solid hydrolysed mixed material comprising homogeneously distributed oxides and/or hydroxides with residual anions of the starting salts possibly present in some cases, which may be dried at 80°-120° C., optionally in a vacuum.

Instead, the same or similar salt mixtures in aqueous solution can be treated with a suitable base or alcohol, e.g., a solution in water of ammonium hydroxide, to obtain a precipitate in solid or gel form, which may then be washed and dried thermally, e.g., at 80°-120° C. or by freeze drying.

In either case, the aforesaid solid product may then be reduced in size by grinding or milling. These particles are then typically calcined in air at 500°-1100° C., preferably 600°-950° C. to drive off water and any volatile anions and to convert them fully to a mixed oxide.

The calcined material may then be wet-milled in water or a suitable organic liquid such as isopropanol or ethanol, followed by drying, e.g., oven drying, at e.g., 80°-120° C., or freeze drying.

The dried calcined material is then typically uniaxially and/or isostatically pressed at pressures of 10-50 MPa [uniaxial] or 100-500 MPa [isostatic], into the desired artifacts, and is then sintered as described above.

Instead of the wet chemical synthesis described above, rapid solidification techniques such as melting followed by spraying the melt through air into water to obtain particles of a suitable particle size may be employed as a synthesis route, these particles then being milled, pressed and sintered as described above.

The invention is now described, by way of illustration with reference to the following non-limited Examples.

EXAMPLE 1

Various aqueous starting solutions were prepared containing dissolved therein a zirconium salt selected from zirconium oxychloride, zirconium sulphate or zirconium tetrachloride, together with cerium chloride and lanthanum chloride. These solutions were heated to dryness in air at 100° C., i.e., to substantially constant mass.

The dried powders were ground and calcined in air to substantially constant mass at 950° C., after which they were attrition wet-milled for four hours in isopropanol. The milled slurries were then oven dried to constant mass at 100° C. in air, to form lanthana-ceria-zirconia powders.

The resulting powders were then uniaxially pressed at 40 MPa and then isostatically pressed at 300 MPa into shaped artifacts and the artifacts were fired in air to temperatures in the range 1400-1600° C. to produce sintered products. Details of these products are set out in Table I hereunder.

Various samples were prepared with varying mole ratios between the zirconia, ceria and lanthana therein. In Samples 1 to 9 the starting zirconium salt was either zirconium oxychloride or zirconium tetrachloride, and the initial salt solutions were dried for 50 hours with a final drying stage in a vacuum oven. When these samples were dried after the milling, there was also a final drying stage under vacuum. In the case of Samples 10 to 18 the start zirconium salt was either zirconium oxychloride or zirconium sulphate and the initial solutions were dried for 24 hours with no final vacuum drying stage, but no significant differences were found to arise from the zirconium salt used or from the presence or absence of vacuum drying, different drying times or the manner of pressing.

In Table I the compositions of the ceramics are set out in terms of zirconia/ceria/lanthana mole ratios, with details of their sintering temperatures [°C], density [g/cm³], hardness [GPa], modulus of rupture [MPa], and whether or not cracking occurred upon Vickers indentation loading under a 50 kg load. The indentation loading was carried out on samples of ceramic polished to a surface finish of better than 0.25 microns, and in those cases where indentation loading showed no cracking, a high degree of toughness was indicated. The phases present were identified by X-ray diffraction. These phases were found to include tetragonal zirconia and monoclinic zirconia (as a minor phase) (indicated respectively in Table I by t and m) and other minor phases such as $La_2Zr_2O_7$ and $Ce_2Zr_2O_7$ (indicated respectively on the table by L and C). The intensities of reflections of the minor phases (i.e., the phases other than tetragonal zirconia) are indicated in Table I in brackets after the minor phases in question as low, medium or high (as the case may be).

in which
$K_c$ is the critical stress intensity factor (fracture toughness) (Pa m$^{\frac{1}{2}}$);
E is Young's modulus (Pa);
H is hardness (Pa);
P is indentation load (N); and
C is half-crack length as defined by Anstis et al. (m).

TABLE I

| Sample | ZrO$_2$:CeO$_2$:La$_2$O$_3$ Molar Ratio | Sintering Temperature | Density | Phases Present | Hardness | Modulus of Rupture | Cracking on indentation loading | K$_c$ |
|---|---|---|---|---|---|---|---|---|
| 1 | 89.25:10:0.75 | 1500° C. | 6.19 | t | 8.16 | 440 | none | |
| 2 | 89.25:10:0.75 | 1400° C. | 6.23 | t + m(low) + L(low) | 8.46 | 458 | none | |
| 3 | 89.50:10:0.50 | 1400° C. | 6.30 | t + m(low) + L(low) | 10.30 | 550 | none | |
| 4 | 89.50:10:0.50 | 1400° C. | 6.16 | t + m(low) + L(low) | 8.20 | 530 | none | |
| 5 | 89.75:10:0.25 | 1400° C. | 6.12 | t + m(medium) | 9.10 | 352 | some | |
| 6 | 89.25:11:0.75 | 1400° C. | 6.12 | t | 11.50 | 597 | none | |
| 7 | 89.25:12:0.75 | 1400° C. | 6.25 | t + l(low) | 10.44 | 560 | none | |
| 8 | 90:10:0 [Control] | 1400° C. | 5.63 | t + m(high) | 6.5 | 110 | large | |
| 9 | 90:10:0 [Control] | 1500° C. | 5.51 | t + m(high) | 5.1 | 93 | large | |
| 10 | 87.70:12:0.30 | 1400° C. | 6.174 | t + c(low) | 9.57 | | | 18.6 |
| 11 | 87.40:12:0.60 | 1400° C. | 6.178 | t + c(low) | 9.81 | | | 19.2 |
| 12 | 87.10:12:0.90 | 1400° C. | 6.189 | t + c(medium) | 11.49 | | | 20.0 |
| 13 | 85.65:14:0.35 | 1500° C. | 6.223 | t + c(low) | 9.94 | | | 17.1 |
| 14 | 85.30:14:0.70 | 1500° C. | 6.259 | t + c(low) | 10.47 | | | 14.4 |
| 15 | 84.95:14:1.05 | 1500° C. | 6.260 | t + c(medium) | 11.19 | | | 10.3 |
| 16 | 83.60:16:0.40 | 1600° C. | 6.178 | tm(low) | 8.14 | | | 8.33 |
| 17 | 83.20:16:0.80 | 1600° C. | 6.231 | t | 9.0 | | | 6.21 |
| 18 | 82.88:16:1.20 | 1600° C. | 6.198 | tc(low) | 10.33 | | | 5.10 |

In those samples where cracking occurred upon indentation loading [except for Samples 5, 8 and 9] an estimate is given in Table I of critical stress intensity factor (K$_c$) using the equation developed by Anstis et al. (see J. Amer. Ceram. Soc. 64 (9) 1981), i.e., $$K_c = 0.016 \, (E/H)^{\frac{1}{2}} P/C^{3/2}$$

EXAMPLE 2

Similar starting solutions to those described in Example 1 were sprayed into an aqueous ammonium hydroxide solution to obtain a mixed hydroxide precipitate containing hydroxides of zirconium, cerium and lanthanum. This precipitate was washed a number of times with ethanol and finally with acetone to obtain a gel and the gel was dried as described for the starting solutions in Example 1. The dried powders were then ground, calcined, wet-milled, dried, pressed and fired as described in Example 1. Results are set out in Table II hereunder. Suitable dissolved solids concentrations for the starting solution and the ammonium hydroxide solution can easily be obtained by routine experimentation to facilitate production of the precipitate.

TABLE II

| Sample | ZrO$_2$:CeO$_2$:La$_2$O$_3$ Molar Ratio | Sintering Temperature | Density | Phases Present | Hardness | Cracking on indentation loading | K$_c$ |
|---|---|---|---|---|---|---|---|
| 19 | 89.75:10:0.25 | 1400° C. | 6.20 | t | 10.67 | none | |
| 20 | 89.50:10:0.50 | 1400° C. | 6.22 | t | 11.10 | none | |
| 21 | 89.25:10:0.75 | 1400° C. | 6.24 | t | 11.80 | none | |
| 22 | 89.75:10:0.25 | 1500° C. | 6.22 | t + L(low) | 10.72 | none | |
| 23 | 89.50:10:0.50 | 1500° C. | 6.25 | t + L(low) | 11.00 | none | |
| 24 | 89.25:10:0.75 | 1500° C. | 6.27 | t + L(low) | 11.80 | none | |
| 25 | 89.75:10:0.25 | 1600° C. | 6.23 | t + m(low) | 9.82 | | 19.15 |
| 26 | 89.50:10:0.50 | 1600° C. | 6.24 | t + m(low) | 9.89 | | 18.03 |
| 27 | 89.25:10:0.75 | 1600° C. | 6.26 | t + m(low) | 10.03 | | 17.21 |

EXAMPLE 3

Example 2 was repeated except that each starting solution was sprayed into isopropanol instead of an aqueous ammonium hydroxide solution to obtain a mixed hydroxide precipitate, and this precipitate was washed with acetone only. Results are set out in Table III hereunder.

TABLE III

| Sample | ZrO$_2$:CeO$_2$:La$_2$O$_3$ Molar Ratio | Sintering Temperature | Density | Phases Present | Hardness | Cracking on indentation at 50 kg | K$_c$ |
|---|---|---|---|---|---|---|---|
| 28 | 89.75:10:0.25 | 1400° C. | 6.22 | t | 11.75 | none | |
| 29 | 89.50:10:0.50 | 1400° C. | 6.24 | t | 11.83 | none | |
| 30 | 89.25:10:0.75 | 1400° C. | 6.25 | t + L(low) | 10.91 | | 19.33 |

EXAMPLE 4

Example I was repeated, with either zirconium oxychloride or zirconium sulphate in the starting solutions, together with cerium chloride and using praseodymium chloride instead of lanthanum chloride. Results are set out in Table IV hereunder.

TABLE IV

| Sample | ZrO$_2$:CeO$_2$:Pr$_2$O$_3$ Molar Ratio | Sintering Temperature | Density | Phases Present | Hardness | Cracking on indentation at 50 kg | K$_c$ |
|---|---|---|---|---|---|---|---|
| 31 | 89.75:10:0.25 | 1400° C. | 6.239 | t + m(low) | 8.68 | none | |
| 32 | 89.50:10:0.50 | 1400° C. | 6.241 | t | 9.77 | | 20.4 |
| 33 | 89.25:10:0.75 | 1400° C. | 6.246 | t | 11.98 | | 19.2 |
| 34 | 89.75:10:0.25 | 1500° C. | 6.245 | t | 8.84 | none | |
| 35 | 89.50:10:0.50 | 1500° C. | 6.224 | t | 9.57 | | 20.1 |
| 36 | 89.25:10:0.75 | 1500° C. | 6.233 | t + m(low) | 11.11 | | 18.6 |
| 37 | 89.75:10:0.25 | 1600° C. | 6.205 | t + m(low) | 8.00 | | 21.0 |
| 38 | 89.50:10:0.50 | 1600° C. | 6.215 | t + m(low) | 8.73 | | 19.3 |
| 39 | 89.25:10:0.75 | 1600° C. | 6.212 | t + m(low) | 10.53 | | 17.5 |

EXAMPLE 5

Example 1 was repeated, with either zirconium oxychloride or zirconium sulphate in the starting solutions, together with cerium chloride and using, instead of lanthanum chloride, a rare earth metal chloride selected from neodymium chloride, gadolinium chloride or ytterbium chloride. Results are set out in Table V hereunder. In Table 5 the rare earth metal oxide used is shown as M$_2$O$_3$ where M is the rare earth metal in question and O is oxygen, with M being neodymium in Samples 40–42, gadolinium being used in Samples 43–45 and ytterbium being used in Samples 46–48.

TABLE 5

| Sample | ZrO$_2$:CeO$_2$:M$_2$O$_3$ Molar Ratio | Sintering Temperature | Density | Phases Present | Hardness | K$_c$ |
|---|---|---|---|---|---|---|
| 40 | 89.75:10:0.25 | 1400° C. | 6.25 | t | 9.18 | 10.32 |
| 41 | 89.50:10:0.50 | 1400° C. | 6.25 | t | 10.75 | 8.15 |
| 42 | 89.25:10:0.75 | 1400° C. | 6.26 | t | 11.19 | 7.62 |
| 43 | 89.75:10:0.25 | 1400° C. | 6.28 | t | 11.83 | 9.11 |
| 44 | 89.50:10:0.50 | 1400° C. | 6.29 | t | 12.06 | 8.63 |
| 45 | 89.25:10:0.75 | 1400° C. | 6.31 | t | 12.50 | 7.02 |
| 46 | 89.75:10:0.25 | 1400° C. | 6.31 | t | 12.05 | 6.51 |
| 47 | 89.50:10:0.50 | 1400° C. | 6.30 | t | 12.66 | 6.01 |
| 48 | 89.25:10:0.75 | 1400° C. | 6.29 | t | 13.21 | 5.13 |

Toughness was also measured by the chevron notch bar technique for Examples 1 to 4, and values conservatively measured of above 10 MPa.m$^{\frac{1}{2}}$ were regularly achieved, and up to 12 MPa.m$^{\frac{1}{2}}$ was found in one case; and desirably small grain sizes of less than 4 microns could be obtained, typically 2–3 microns.

Finally, it must be noted from Samples 8 and 9 in Example 1 that, when lanthana and/or praesodymia were omitted, no exceptional toughness was observed at 10 mole % ceria. Employing lanthana and/or praesodymia with zirconia but without any ceria, did not lead to a successful product. The Applicant has also found that none of the other rare earth oxides which it has tested, such as neodymia, gadolinia and ytterbia (Example 5) confers the advantages obtained from lanthana and/or praseodymium in a zirconia/ceria ceramic product.

What is claimed is:

1. A sintered ceramic product which is a substantially homogeneous mixture consisting essentially of:
   76–92 mole % zirconia;
   8–20 mole % ceria; and
   0.1–1.2 mole % of a rare earth metal oxide selected from the group consisting of lanthana, praseodymia and mixtures thereof, and at most 0.1 mole % in total of Nd$_2$O$_3$, Gd$_2$O$_3$, and Yb$_2$O$_3$ as impurities, the zirconia, ceria and said rare earth metal oxide forming at least 95% by mass of the mixture.

2. A product as claimed in claim 1, in which the mixture comprises:
   82–90 mole % zirconia;
   10–12 mole % ceria; and
   0.25–0.8 mole % of a rare earth metal selected from the group consisting of lanthana and praseodymia.

3. A product as claimed in claim 2, in which the mixture comprises:
   88–90 mole % zirconia;
   10–10.5 mole % ceria; and
   0.25–0.6 mole % of a rare earth metal oxide selected from the group consisting of lanthana and praseodymia.

4. A product as claimed in claim 1, in which the selected rare earth metal oxide is lanthana.

5. A product as claimed in claim 1, which contains at most 5% by mass of impurities constituted by one or more members of the group consisting of HfO$_2$, Sm$_2$O$_3$, TiO$_2$ and mixtures thereof.

6. A product as claimed in claim 5, which contains at most 2% by mass of said impurities.

7. A product as claimed in claim 6, which contains at most 1% by mass of said impurities.

8. A product as claimed in claim 1, which contains at most 0.01 mole % in total of $Nd_2O_3$, $Gd_2O_3$ and $Tb_2O_3$.

9. A product as claimed in claim 8, which contains at most 0.01 mole % in total of $Nd_2O_3$, $Gd_2O_3$ and $Yb_2O_3$.

10. A product as claimed in claim 1, in which the selected rare earth metal oxide is praseodymia.

11. A product as claimed in claim 1, in which the rare earth metal oxide is a mixture of lanthana and praseodymia.

12. A product as claimed in claim 1, wherein the substantially homogeneous mixture is sintered to a temperature of 1200-1700° C.

13. A sintered ceramic product whenever made by sintering to a temperature of 1200°-1700° C. a mixture consisting essentially of:
    76-92 mole % zirconia;
    8-20 mole % ceria; and
    0.1 -1.2 mole % of a rare earth metal oxide selected from the group consisting of lanthana, praseodymia and mixtures thereof, and at most 0.1 mole % in total of $Nd_2O_3$, $Gd_2O_3$, and $Yb_2O_3$ as impurities, said mixture being obtained by initially forming a solution of salts of zirconium, cerium and a rare earth metal selected from the group consisting of lanthanum, praseodymium, and mixtures thereof, said solution being treated with an alcohol to obtain a precipitate of mixed solid or gel material which is then dried and pressed to form an artifact, said artifact undergoing said sintering to form said ceramic product.

14. A method of making a sintered ceramic product, said method comprising the steps of:
    forming a solution of salts of zirconium, cerium and rare earth metal selected from the group consisting of lanthanum, praseodymium and mixtures thereof;
    treating the solution with an alcohol to obtain a precipitate of mixed solid or gel material;
    drying and pressing the precipitate to form an artifact; and
    sintering the artifact to a temperature of 1200-1700° C., the artifact consisting essentially of a mixture of:
    76-92 mole percent zirconia;
    8-20 mole percent ceria;
    0.1-1.2 mole percent of the selected rare earth metal and at most 0.1 mole % in total of $Nd_2O_3$, $Gd_2O_3$, and $Yb_2O_3$ as impurities.

15. A method as claimed in claim 14, in which the sintering is to a temperature of 1350°-1650° C.

16. A method as claimed in claim 14, in which the sintering temperature and period of sintering are selected to obtain an average grain size in the sintered ceramic product of at most 5 microns.

17. A method as claimed in claim 16, in which the average grain size in the sintered ceramic product is 0.1-3 microns.

18. A method as claimed in claim 14, in which after drying, the precipitate is ground or milled, calcined in air at a temperature of 500°-1100° C. to convert it to a complex oxide, and the complex oxide is ground or milled and dried before it is pressed to form the artifact which is sintered to form the ceramic product.

19. A method as claimed in claim 14, wherein the rare earth metal oxide selected is lanthana.

20. A method as claimed in claim 14, wherein the rare earth metal oxide selected is praseodymia.

21. A method as claimed in claim 14, wherein the rare earth metal oxide selected is a mixture of lanthana and praseodymia.

22. A method as claimed in claim 14, wherein the zirconia, ceria and said rare earth metal oxide form at least 95% by mass of the mixture.

23. A method as claimed in claim 18, wherein the rare earth metal oxide selected is lanthana.

24. A method as claimed in claim 18, wherein the rare earth metal oxide selected is praseodymia.

25. A method as claimed in claim 18, wherein the rare earth metal oxide selected is a mixture of lanthana and praseodymia.

26. A method as claimed in claim 18, wherein the zirconia, ceria and said rare earth metal oxide form at least 95% by mass of the mixture.

27. A product as claimed in claim 13, wherein the rare earth metal oxide selected is lanthana.

28. A product as claimed in claim 13, wherein the rare earth metal oxide selected is praseodymia.

29. A product as claimed in claim 13, wherein the rare earth metal oxide selected is a mixture of lanthana and praseodymia.

30. A product as claimed in claim 13, wherein the zirconia, ceria and said rare earth metal oxide form at least 95% by mass of the mixture.

31. A method of enhancing the toughness of a sintered zirconia/ceria ceramic product which comprises:
    mixing with zirconia and ceria a rare earth metal oxide selected from the group consisting of lanthana, praseodymia and mixtures thereof to form a mixture consisting essentially of:
    76-92 mole % zirconia;
    8-20 mole % ceria; and
    0.1-1.2 mole % of said rare earth metal oxide; and at most 0.1 mole % in total of $Nd_2O_3$, $Gd_2O_3$, and $Yb_2O_3$ as impurities; and
    sintering the mixture to a temperature of 1200°-1700° C.

32. A method as claimed in claim 31, wherein the rare earth metal oxide selected is lanthana.

33. A method as claimed in claim 31, wherein the rare earth metal oxide selected is praseodymia.

34. A method as claimed in claim 31, wherein the rare earth metal oxide selected is a mixture of lanthana and praseodymia.

35. A method as claimed in claim 31, wherein the zirconia, ceria and said rare earth metal oxide form at least 95% by mass of the mixture.

* * * * *

UNITED STATES PATENT AND TRADEMARK OFFICE
CERTIFICATE OF CORRECTION

PATENT NO. : 5,017,532
DATED : May 21, 1991
INVENTORS : Sonnenberg, et al.

It is certified that error appears in the above-identified patent and that said Letters Patent is hereby corrected as shown below:

Column 8, line 67, after "$HfO_2$," insert --$SiO_2$--.

Column 9, line 6, change "0.01 mole" to --0.05 mole--.

Column 9, line 6, change "$Tb_2O_3$" to --$Yb_2O_3$--.

Column 9, line 57, change "5 microns" to --4 microns--.

Column 9, line 49, change "mole percent of" to --mole % oxide of--.

Column 10, line 44, delete "and".

Signed and Sealed this

Tenth Day of November, 1992

Attest:

DOUGLAS B. COMER

Attesting Officer      Acting Commissioner of Patents and Trademarks

UNITED STATES PATENT AND TRADEMARK OFFICE
CERTIFICATE OF CORRECTION

PATENT NO.  : 5,017,532

DATED       : May 21, 1991

INVENTOR(S) : Sonnenberg, et al

It is certified that error appears in the above-identified patent and that said Letters Patent is hereby corrected as shown below:

Column 2, line 10, change "0.5-0.8," to --0.25-0.8--.

Column 2, delete line 29 in its entirety.

Column 2, after line 36, add "The phase present in the products of the invention"

Signed and Sealed this

Ninth Day of March, 1993

*Attest:*

STEPHEN G. KUNIN

*Attesting Officer*  *Acting Commissioner of Patents and Trademarks*